United States Patent [19]

Schmitt et al.

[11] Patent Number: 4,677,180
[45] Date of Patent: Jun. 30, 1987

[54] POLYURETHANE COMPOSITIONS WITH IMPROVED STORAGE STABILITY

[75] Inventors: Peter D. Schmitt, Glen Dale, W. Va.; Peter H. Markusch, McMurray, Pa.

[73] Assignee: Mobay Corporation, Pittsburgh, Pa.

[21] Appl. No.: 886,598

[22] Filed: Jul. 16, 1986

[51] Int. Cl.$^4$ .............................................. C08G 18/80
[52] U.S. Cl. ...................................................... 528/45
[58] Field of Search ......................................... 528/45

[56] References Cited

U.S. PATENT DOCUMENTS

| | | | |
|---|---|---|---|
| 2,801,990 | 8/1957 | Seeger et al. | 260/75 |
| 3,779,794 | 12/1973 | De Santis | 117/72 |
| 4,007,215 | 2/1977 | Hartmann et al. | 260/468 |
| 4,087,392 | 5/1978 | Hartmann et al. | 260/24 |
| 4,101,530 | 7/1978 | Burkhardt et al. | 528/45 |
| 4,132,843 | 1/1979 | Dalibor | 528/45 |
| 4,332,965 | 6/1982 | Dalibor | 560/169 |
| 4,439,593 | 3/1984 | Kelso | 528/45 |

FOREIGN PATENT DOCUMENTS 2623081 11/1977 Fed. Rep. of Germany .
2639491 2/1978 Fed. Rep. of Germany .
1442024 7/1976 United Kingdom .
1523103 8/1978 United Kingdom .

Primary Examiner—Maurice J. Welsh
Attorney, Agent, or Firm—Gene Harsh; Joseph C. Gil; Thomas W. Roy

[57] ABSTRACT

The present invention is directed to a process for improving the storage stability of a composition containing (a) a blocked polyisocyanate component prepared by blocking the isocyanate groups of an organic polyisocyanate with a blocking agent comprising a di-$C_1$-$C_{12}$-alkyl and/or -alkoxyalkyl malonate and (b) a high molecular weight component comprising a compound containing at least two isocyanate-reactive hydrogens, which comprises incorporating a stabilizing amount of a low molecular weight compound having at least 2 hydroxyl groups into the composition by adding said compound to compound (a), component (b) or to the mixture of compounds (a) and (b).

The present invention is also directed to the storage stable composition produced in accordance with the above process.

23 Claims, No Drawings

POLYURETHANE COMPOSITIONS WITH IMPROVED STORAGE STABILITY

FIELD OF THE INVENTION

The present invention is directed to increasing the storage stability of compositions containing blocked polyisocyanates and a compound having isocyanate-reactive hydrogens by adding a stabilizing amount of a low molecular weight compound having at least 2 hydroxyl groups.

DESCRIPTION OF THE PRIOR ART

Coating compositions based on a blocked polyisocyanate component and a component containing isocyanate-reactive hydrogens are known. The purpose of the blocking agent is to prevent the polyisocyanate from reacting with the isocyanate-reactive component at ambient temperature conditions and thus allows the two components to be mixed and stored prior to their actual use. When the composition is baked at an elevated temperature, the blocking agent is released and the reaction of the two components commences. When using common blocking agents such as ε-caprolactam, unblocking temperatures in excess of 170° C. are needed to provide acceptable rates of unblocking.

The high temperatures needed for unblocking are detrimental for two reasons. First, the high temperatures can cause yellowing of the reacted polyurethane compositions. Second, the energy requirements are much higher when compared to competitive systems based on aminoplast resins and polyhydroxyl compounds which can be baked at temperatures of about 125° C. using acid catalysis. Since the unblocking temperatures of the conventional polyisocyanate-based systems are much higher, the manufacturing facilities designed for the competitive aminoplast systems cannot accommodate the conventional blocked polyisocyanate systems. Accordingly, even though the compositions based on blocked polyisocyanates and compounds containing isocyanate-reactive hydrogens yield products with a combination of superior hardness and elasticity when compared to the competitive systems, the need exists for a polyisocyanate-based system which is stable under ambient conditions and wherein the blocked polyisocyanate component may be reacted at lower temperatures within an acceptable period of time.

While it is known from U.S. Pat. Nos. 2,801,990; 3,779,794; 4,007,215; 4,087,392; 4,101,530; 4,132,843 and 4,332,965; British Pat. Nos. 1,442,024 and 1,523,103; German Offenlegungsschrift No. 2,623,081 and German Auslegeschrift No. 2,639,491 that polyisocyanates blocked with C—H acidic compounds such as malonic acid esters and acetoacetic acid esters can be reacted at lower temperatures, it has been found that when combined with suitable co-reactants, these systems do not remain stable. When these systems are stored, the viscosity gradually increases until the systems gel. The higher the storage temperature, the faster gelation occurs.

Accordingly, it is an object of the present invention to provide compositions based on a blocked polyisocyanate component and a component containing isocyanate-reactive hydrogens which possess improved storage stability. It is another object to provide compositions wherein the polyisocyanate can be reacted at lower temperatures than conventional blocked polyisocyanates. It is a further object to provide compositions which can be cured to produce polyurethanes possessing properties which are superior to the competitive, low temperature systems.

In U.S. Pat. No. 4,439,593 it is disclosed that these objectives may be achieved by adding stabilizers to the mixture of the blocked polyisocyanate component and the component containing isocyanate-reactive hydrogens; however, this patent requires the stabilizers to have monofunctional reactivity with isocyanate groups, i.e., monoamines or monoalcohols. While these stabilizers improve the storage stability, they can have a detrimental effect on coating properties. During subsequent curing of the stabilized compositions, the monofunctional stabilizers can act as chain terminators and prevent the buildup of high molecular weights, thus, affecting the properties of the cured coatings. Accordingly, it is an additional object of the present invention to satisfy the previous objectives without using a stabilizer which can also function as a chain terminator.

These and other objects may be achieved by proceeding in accordance with the present invention as described below.

SUMMARY OF THE INVENTION

The present invention is directed to a process for improving the storage stability of a composition containing (a) a blocked polyisocyanate component prepared by blocking the isocyanate groups of an organic polyisocyanate with a blocking agent comprising a di-$C_1$–$C_{12}$-alkyl and/or -alkoxyalkyl malonate and (b) a component based on a compound containing at least two isocyanate-reactive hydrogens and having a molecular weight of about 800 to 10,000, by incorporating a stabilizing amount of a low molecular weight compound having at least 2 hydroxyl groups and a molecular weight of less than 400 into the composition by adding said compound to component (a), component (b) or to the mixture of components (a) and (b), the composition not containing a stabilizing amount of a compound which has monofunctional reactivity toward isocyanate groups.

The present invention is also directed to the storage stable composition produced in accordance with the above process.

DETAILED DESCRIPTION OF THE INVENTION

The blocked polyisocyanates used in the compositions of the present invention preferably contain an average of about 2–6, preferably about 2–4, blocked isocyanate groups per molecule and may be prepared from virtually any organic polyisocyanate, preferably from polyisocyanates containing 2–4 isocyanate groups. Preferred are polyisocyanates having aromatically-, aliphatically- or cycloaliphatically-bound isocyanate groups, or mixtures thereof.

The polyisocyanates used for preparing the blocked polyisocyanates may be monomeric in nature or adducts prepared from organic diisocyanates and containing biuret, allophanate, urea, urethane or carbodiimide groups or isocyanurate rings. Suitable polyisocyanates which may be used as such or as intermediates for preparing polyisocyanate adducts include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4- diisocyanate and mixtures of these isomers, 1-isocyanato-2-isocyanatomethyl cyclopentane, 1-isocyanato-3,3,5-trimethyl-5-isocyanatomethyl cyclohexane, 2,4- and 2,6-hexahydro tolylene diisocyanate and mixtures of these isomers, diphenyl methane-2,4'- and/or -4,4'-diisocyanate, naphthalene-1,5-diisocyanato, triphenyl methane-4,4',4"-triisocyanate, polyphenyl polymethylene polyisocyanates of the type obtained by condensing aniline with formaldehyde followed by phosgenation, and mixtures of the above-mentioned polyisocyanates.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using co-reactants such as water, tertiary alcohols, primary and secondary monoamines, and primary and/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Pat. No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift No. 1,150,080; German Offenlegungsschrift No. 2,325,826; and British Pat. No. 1,465,812. The preferred diisocyanates to be used are 2,4-diisocyanatotoluene, 2,6-diisocyanatotoluene, mixtures of these isomers, 1,6-diisocyanatohexane, isophorone diisocyanate and mixtures of the latter two diisocyanates.

Polyisocyanate adducts containing urea and/or urethane groups and based on the reaction product of the previously mentioned diisocyanates and compounds containing 2 or more isocyanate-reactive hydrogens may be prepared according to the process disclosed in U.S. Pat. No. 3,183,112. In preparing polyisocyanate adducts the average isocyanate functionality is determined from the functionality of the compounds containing isocyanate-reactive hydrogens. For example, theoretically when an excess of diisocyanate is reacted with a diol, a polyisocyanate with a functionality of approximately 2 will be produced, while a triol co-reactant will result in a polyisocyanate functionality of at least 3. By using mixtures of compounds containing isocyanate-reactive hydrogens, various functionalities can be obtained. Suitable compounds containing 2 or more isocyanate-reactive hydrogens are those with molecular weights of up to 400 as set forth hereinafter as suitable for preparing the high molecular weight polyesters and polyethers and for use as the stabilizers having at least 2 hydroxyl groups in accordance with the present invention. The preferred diisocyanates are 2,4-diisocyanatotoluene, 2,6-diisocyanatotoluene, mixtures of these isomers, 1,6-diisocyanatohexane and isophorone diisocyanate.

Prior to their use in the compositions of the present invention, the polyisocyanates are blocked with C—H acidic compounds such as a di-$C_1$–$C_{12}$-alkyl and/or alkoxyalkyl, preferably a $C_1$–$C_4$-dialkyl malonate. The most preferred blocking agent is diethyl malonate. Preferably, these blocking agents are used as the sole blocking component for reaction with the polyisocyanates. However, it is possible to use up to about 20 mole %, preferably up to about 10 mole %, of other known blocking agents, e.g. secondary or tertiary alcohols such as isopropanol or t-butanol; oximes such as formaldoxime, acetaldoxime, butanone oxime, cyclohexanone oxime, acetophenone oxime, benzophenone oxime or diethyl glyoxime; lactams such as $\epsilon$-caprolactam or $\delta$-valerolactam; phenols such as phenol or cresol; N-alkyl amides such as N-methyl acetamide; imides such as phthalimide; imidazole; or alkali metal bisulfites. While polyisocyanates blocked with these other known blocking agents will react normally with the isocyanate-reactive component of the subject invention when using sufficiently elevated temperatures, they will not react significantly at the preferred low temperature baking conditions of the present invention and, accordingly, should only be used in the amounts specified when operating in this manner. To compensate for the low reactivity of these blocked polyisocyanates; the amount of the isocyanate-reactive component may be correspondingly reduced. The unreacted blocked polyisocyanates will remain in the cured coating and provide a softening effect.

It is also possible to replace up to about 60 mole %, preferably up to about 50 mole %, of the malonate-based blocking agents with acetoacetic acid $C_1$–$C_{12}$-, preferably $C_1$–$C_4$-alkyl or -alkoxyalkyl esters such as ethylacetoacetate or ethoxyethylacetoacetate. It has been found that when acetoacetic acid esters are exclusively used as the blocking agent, the reactivity of the blocked polyisocyanate towards the isocyanate-reactive component is reduced in the presence of the stabilizer resulting in coatings which are tacky and incompletely cured. However, when equimolar mixtures of the dialkyl malonate and acetoacetic acid esters are used as the blocking agent, fully cured films are obtained from stabilized compositions of the present invention.

The reaction between the polyisocyanates and the blocking agent is generally conducted at above about 50° C., preferably from about 60° to 100° C., optionally in the presence of a basic catalyst such as diazabicyclooctane, triethyl amine, alkali metal alcoholates such as sodium methoxide or alkali metal phenolates such as sodium phenolate.

The component to be used in combination with the blocked polyisocyanates is selected from the known high molecular weight compounds containing isocyanate-reactive groups, preferably hydroxyl groups, which are at least difunctional in the sense of the isocyanate-addition reaction.

These compounds generally have an average functionality of about 2 to 15, preferably about 2 to 8 and most preferably about 2 to 4. The amounts of the blocked polyisocyanate component and the component containing at least 2 isocyanate-reactive hydrogens are chosen so that for every isocyanate-reactive group the composition contains from about 0.1 to 1.6 and preferably from about 0.9 to 1.1 isocyanate groups blocked by C—H acidic compounds. It is possible during the actual production of the compositions according to the present invention to use the lacquer solvents which are in most cases required for their subsequent use.

The high molecular weight compounds containing at least two isocyanate-reactive hydrogen atoms present in the binders according to the present invention generally have a molecular weight of from about 800 to 10,000, preferably from about 800 to 8,000 and most preferably from about 1,000 to 3,000.

Preferred high molecular weight compounds containing isocyanate-reactive hydrogen atoms are the known polyester polyols, polyether polyols, polyhydroxy polyacrylates and polycarbonates containing hydroxyl groups. In addition to these preferred polyhydroxyl compounds it is also possible in accordance with the present invention to use polyhydroxy polyacetals, polyhydroxy polyester amides, polythioethers containing terminal hydroxyl groups or sulphdryl groups or at least difunctional compounds containing amino groups, thiol groups or carboxyl groups. Mixtures of these compounds containing isocyanate-reactive hydrogen atoms may also be used.

High molecular weight polyester polyols which are suitable include, e.g. reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid; azelaic acid, sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bis-glycolterephthalate. Suitable polyhydric alcohols include, e.g. ethylene glycol; propane glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; glycerol; trimethylolpropane; hexanetriol-(1,2,6); butanetriol-(1,2,4); trimethylolethane; triethylene glycol; tetraethylene glycol; polyethylene glycol; dipropylene glycol; polypropylene glycol; dibutylene glycol and polybutylene glycol. The polyesters may also contain a proportion of carboxyl end groups. Polyesters of lactones, e.g. ε-caprolactone, or hydroxycarboxylic acids, e.g., ω-hydroxycaproic acid, may also be used.

The high molecular weight polyethers which are preferably used according to the invention are obtained in known manner by reaction of the starting compounds which contain reactive hydrogen atoms with alkylene oxides such as ethylene oxide; propylene oxide; butylene oxide; styrene oxide; tetrahydrofuran or epichlorohydrin or with any mixtures of these alkylene oxides.

Suitable starting compounds containing reactive hydrogen atoms include, e.g. water; methanol; ethanol; ethylene glycol; propylene glycol-(1,2) or -(1,3); butylene glycol-(1,4) or -(1,3); hexandiol-(1,6); octanediol-(1,8); neopentyl glycol; 1,4-bis-hydroxymethylcyclohexane; 2-methyl-1,3-propanediol; glycerol; trimethylolpropane; hexanetriol-(1,2,6); butanediol-(1,2,4); trimethylolethane; pentaerythritol; mannitol; sorbitol; methyl glycoside; sucrose; phenol; isononylphenol; resorcinol; hydroquinone 1,2,2- or 1,1,3-tris-(hydroxyphenol)-ethane; ammonia; methylamine; ethylene diamine; tetra- or hexamethylene diamine; diethylenetriamine; ethanolamine; diethanolamine; triethanolamine; aniline; phenylenediamine; 2,4- and 2,6-diaminotoluene and polyphenylpolymethylene polyamines of the kind obtained by aniline-formaldehyde condensation optionally containing alkyl substituents such as bis-(4-amino-3-methyl-phenyl)-methane. Resinous materials such as phenol and resol resins may also be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from glycols such as diethylene glycol; triethylene glycol; 4,4'-dioxethoxy-diphenyldimethylene; hexanediol and formaldehyde. Polyacetals suitable for the purpose of the invention may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with diarylcarbonates, e.g. diphenylcarbonate, or phosgene.

Suitable polyhydroxy polyester amides and polyamides are, for example, the predominately linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxyfunctional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, and 2-isocyanatoethyl methacrylate.

The preferred high molecular weight polyol components are the polyester, polyacrylate, polycarbonate and polyether polyols or mixtures thereof.

In addition to using the previously described polyisocyanates for preparing the blocked polyisocyanate component of the subject application, it is also possible to prepare the blocked polyisocyanate component from isocyanate-terminated prepolymers. These prepolymers are formed by reacting an excess of the previously described polyisocyanates with the previously described high molecular weight isocyanate-reactive compounds, and optionally the low molecular weight isocyanate-reactive compounds set forth as suitable for preparing the high molecular weight polyesters and polyethers and for use as the stabilizers having at least 2 hydroxyl groups in accordance with the present invention.

It is also possible, though less preferred, to use polyamines, preferably diamines as the low molecular weight isocyanate-reactive components. Suitable polyamines are essentially hydrocarbon polyamines which have isocyanate-reactive hydrogens according to the Zerewitinoff test, e.g. primary or secondary amine groups. The polyamines are generally aromatic, aliphatic or alicyclic amines containing between about 1 to 30 carbon atoms, preferably about 2 to 15 carbon atoms, and most preferably about 2 to 10 carbon atoms. Examples of suitable polyamines include diaminoethane, 1,6-diaminohexane, piperazine, 2,5-dimethylpiperazine, 1-amino-3-aminomethyl-3,5,5-trimethylcyclohexane, bis-(4-aminocyclohexyl)-methane, bis-(4-amino-3-methyl-cyclohexyl)-methane, 1,4-diaminocyclohexane, 1,2-propylenediamine, hydrazine, amino acid hydrazides, hydrazides of semicarbaziocarboxylic acids, bishydrazides, bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)piperazine, N,N,N'-tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3propane diamine, 3,3'-diaminobenzidine, 2,4,6-triaminopyrimidine, polyoxypropylene amines, tetrapropylenepentamine, tripropylenetetramine, N,N-bis-(6-aminohexyl)-amine, N,N'-bis-(3-aminopropyl)-ethylene diamine and 2,4-bis-(4'-aminobenzyl)-aniline.

Prepolymers prepared exclusively from polyisocyanates and low molecular weight isocyanate-reactive compounds are referred to as polyisocyanate adducts containing urea and/or urethane groups and have been previously discussed. A sufficient excess of the polyisocyanate should be used to ensure that the prepolymers are terminated with isocyanate groups.

It should also be ensured that the isocyanate-terminated prepolymers remain soluble in the commonly used polyurethane solvents and do not gel. Gelation may result when sufficiently cross-linked, isocyanate-terminated prepolymers are prepared from polyisocyanates or isocyanate-reactive compounds containing more than two reactive groups. Minimal amounts of crosslinking do not lead to gelation; however, once a sufficient cross-linked density is achieved, gelation occurs. The critical cross-link density, commonly referred to as the gel point, may be calculated by known methods or readily determined by simply reacting the desired components and observing whether gel particles form. In order to avoid gelation, it is preferred to prepare the isocyanate-terminated prepolymers from the polyisocyanates described as suitable for use in preparing the polyisocyanate adducts rather than using the polyisocyanate adducts themselves. It is additionally preferred to prepare the isocyanate-terminated prepolymers from high molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate throughout the formation of the prepolymer.

Following the formation of the isocyanate-terminated prepolymers, the prepolymers are blocked with the C—H acidic compounds in the previously described manner. The blocked isocyanate-terminated prepolymers are then mixed with the high molecular weight, isocyanate-reactive compounds utilizing the ratio of blocked isocyanate groups to isocyanate-reactive groups previously set forth herein.

In addition to using the previously described high molecular weight isocyanate-reactive compounds in formulating the compositions of the subject invention, it is also possible to use OH-terminated prepolymers as a portion or all of this component. The OH-terminated prepolymers are prepared by reacting an excess of a high molecular weight compound containing hydroxyl groups with a polyisocyanate. The same concerns previously set forth for avoiding gelation in the formation of the isocyanate-terminated prepolymers should also be followed in preparing the OH-terminated prepolymers. In addition, when preparing the OH-terminated prepolymers, the polyisocyanate should be added to the hydroxyl-containing compound in order to maintain an excess of the isocyanate-reactive compound throughout the formation of the OH-terminated prepolymer.

It is also possible to satisfy the requirements of components (a) and (b) by providing compounds containing one blocked isocyanate group and one isocyanate-reactive group. For example, instead of forming a composition from a diisocyanate containing two blocked isocyanate groups and an equivalent amount of a compound containing two isocyanate-reactive groups, the same components can be used to prepare a compound containing one blocked isocyanate group and one isocyanate-reactive group as follows. One of the isocyanate groups of the diisocyanate is blocked to form a compound containing one blocked isocyanate group and one free isocyanate group. This compound is then reacted with an equivalent amount of an isocyanate-reactive compound (equivalent ratio of free isocyanate groups to isocyanate-reactive groups equals 1:2, equivalent ratio of blocked plus free isocyanate groups to isocyanate-reactive groups equals 1:1) to form the compound containing one blocked isocyanate group and one isocyanate-reactive group. Other examples of compounds of this type which satisfy the requirements of both components (a) and (b) would be readily apparent to those skilled in the art.

Once the polyisocyanate components and the isocyanate-reactive component have been selected, the storage stability of compositions containing a blocked polyisocyanate component and an isocyanate-reactive component may be improved by incorporating a stabilizing amount of a low molecular weight compound having at least 2 hydroxyl groups. The stabilizer may be added to the composition or to the individual components prior to their being mixed to form the compositions. The stabilizers have a molecular weight of less than 400, preferably less than 300, and contain at least 2 hydroxyl groups, preferably 2 or 3 hydroxyl groups, and most preferably 2 hydroxyl groups. The stabilizers may also contain ether, thioether, ester, urethane and/or urea bonds.

Preferred stabilizers are compounds corresponding to the formula $$R_1(OH)_n$$

wherein $R_1$ is a straight or branched chain having 2 to 10, preferably 2 to 4 carbon atoms and n has a value of 2 or 3, preferably 2. Examples include propylene glycol-(1,2) and -(1,3), butylene glycol-(1,4) and -(1,3); hexanediol-(1,6); octane diol-(1,8); neopentyl glycol; cyclohexane dimethanol (1,4-bis-hydroxymethylcyclohexane); 2-methyl-1,3-propanediol; glycerol; trimethylolpropane; hexane triol-(1,2,6); butanetriol-(1,2,4) or trimethylolethane, and also glycols such as ethylene glycol, diethyleneglycol, triethylene glycol, tetraethylene glycol and polyethylene glycols having a molecular weight of up to 400. In addition compounds such as dipropylene glycol, polypropylene glycols having a molecular weight of up to 400, dibutylene glycol, polybutylene glycols having a molecular weight of up to 400, thiodiglycol and castor oil may also be used according to the invention.

Also suitable as stabilizers are ester diols of the general formulae $$HO-(CH_2)_x-CO-O-(CH_2)_y-OH$$

and $$HO-(CH_2)_x-O-CO-R-CO-O-(CH_2)_x-OH$$

in which
R represents an alkylene or arylene group having from 1 to 10, preferably 2 to 6 carbon atoms,
x=2 to 6 and
y=3 to 5, e.g. δ-hydroxybutyl-ε-hydroxycaproic acid ester; ω-hydroxyhexyl-δ-hydroxybutyric acid ester; adipic acid-bis-(β-hydroethyl)-ester and terephthalic acid-bis-(β-hydroxyethyl)-ester; as well as diol urethanes of the general formula $$HO-(CH_2)_x-O-CO-NH-R'-NH-CO-O-(CH_2)_x-OH$$

in which
R' represents an alkylene, cycloalkylene or arylene group having from 2 to 15, preferably from 2 to 9 carbons and
x represents an integer of from 2 to 6, e.g. 4,4'-dicyclohexyl-methane-bis-(β-hydroxyethylurethane) or 4,4'-dicyclohexyl-methane-bis-(β-hydroxybutylurethane).

Also suitable are diol ureas of the general formula $$HO-(CH_2)_x-\underset{R'''}{N}-CO-NH-R''-NH-CO-\underset{R'''}{N}-(CH_2)_x-OH$$

in which
R'' represents an alkylene, cycloalkylene or arylene group having from 2 to 15, preferably from 2 to 9 carbons and
R''' represents hydrogen or a methyl group and
x=2 or 3.

The stabilizers are added in amounts greater than 0.01%, preferably greater than about 0.2, and most preferably greater than about 1% by weight based on the solids content of the coating composition. The upper limit of the stabilizers is generally 20%, preferably 10%, and most preferably 5% based on the solids content of the coating composition. Even though amounts greater than about 20% by weight do not normally further improve the stability, amounts greater than 20% may be used when it is desired to also use the stabilizers as chain extenders.

A solvent or solvent mixture can be used during production of the compositions or when mixing the polyisocyanate component with the components containing isocyanate-reactive groups. This solvent or solvent mixture preferably remains in the composition until it is used. However, it is of course also possible to use a solvent simply to promote thorough mixing of the components and subsequently to distill off this solvent (in vacuo) leaving a ready-to-use mixture in solvent-free form which may be redissolved in solvents at any later stage.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

When solvents are used in the compositions prepared according to the present invention, the solvents are generally present in such quantities that the content of nonvolatile binder constituents is no less than about 20%, preferably from about 30 to 80% by weight. In other words, the solvent may be used in amounts of up to about 80% by weight, preferably about 20 to 70% by weight.

Additives, such as catalysts, pigments, dyes and levelling aids, may be added as required to the compositions of the present invention.

The compositions produced according to the present invention may be stored as such at prolonged periods at room temperature without gel formation or any other undesirable changes occurring. They may be diluted as required to a suitable concentration and applied by the conventional methods, for example spraying or spread coating, and heated, generally to temperatures in excess of about 100° C., preferably from about 100° to 150° C., more preferably from about 120° to 130° C., in order to cure the coating. However, if very short times are required, e.g., times as short as 1–2 minutes may be used for coil coatings, then cure temperatures may be as high as 250° C., or even 300° C.

The compositions may be used as coating agents for primer, intermediate or surface coatings for a variety of different substrates. The resulting coatings sess excellent adhesion to substrates, are uniform and exhibit excellent mechanical and chemical properties and water and solvent resistance, especially hardness, impact resistance and elasticity.

The invention is further illustrated, but is not intended to be limited by the following examples in which all parts and percentages are by weight unless otherwise specified.

EXAMPLES

The following components were used in the Examples as indicated.

Polyisocyanate Component I 2,484 parts of polypropylene glycol (MW 4,000) were added to and reacted with 1,000 parts of a 70:30 mixture of 4,4'- and 2,4'-diphenylmethane diisocyanate at a temperature of 60°–70° C. until an NCO content of 7.8% was obtained.

2,000 parts of this isocyanate-terminated prepolymer were mixed with 715.4 parts of diethyl malonate and 13 parts of a 25% solution of sodium methoxide in methanol and heated to 60°-70° C. for several hours. During the reaction, 1430 parts of ethylene glycol monoethyl ether acetate were added and the temperature of 60°-70° C. was maintained until the NCO content was essentially 0.

Polyisocyanate Component II

The theoretical reaction product of 3 moles of 2,4-diisocyanato-toluene and 1 mole of trimethylol propane was prepared by reacting an excess of the diisocyanate with the triol and subsequently removing the excess diisocyanate by distillation. The polyisocyanate adduct containing urethane groups was diluted to a solid content of 75% with ethyl acetate. 2,500 parts of the 75% polyisocyanate adduct solution were mixed with 1,362 parts of diethyl malonate and 9.2 grams of a 25% solution of sodium methoxide in methanol. The mixture was heated to about 80° C. and maintained within that temperature range for several hours until the NCO content was essentially 0. An additional 444 parts of ethyl acetate were added during this time.

Polyisocyanate Component III 1,700 parts of a biuret-containing polyisocyanate based on hexamethylene diisocyanate were mixed with 1,664 parts of diethyl malonate and 1,114 parts of propylene glycol monomethyl ether acetate. 10.1 parts of sodium methoxide were added to this mixture which was then maintained at a temperature of 60°-70° C. for several hours until the NCO content was essentially 0.

Isocyanate-reactive Component I

A polyester polyol having an OH number of 145 and a functionality of 3.1 was prepared from 1,6-hexane diol and trimethylol propane (weight ratio 3.5:1) and isophthalic acid, adipic acid and phthalic acid anhydride (weight ratio 5.6:2:1).

Isocyanate-reactive Component II

A polyester polyol having an OH number of 44 and a functionality of 2 was prepared from adipic acid and diethylene glycol.

Isocyanate-reactive Component III

A polyester polyol having an OH number of 150 and a functionality of 3 was prepared from triethanolamine and propylene oxide.

EXAMPLE 1

750 parts of Polyisocyanate Component II were mixed with 1,678.5 parts of Isocyanate-reactive Component II and 772.5 parts of propylene glycol monomethyl ether acetate to form a composition having a solids content of 70%. The stabilizers set forth in Tables I and II were added to 223.4 part samples of the composition and stored at ambient temperature (Table I) and 40° C. (Table II). The viscosities of the various samples were determined at 25° C. at the intervals reported in the Tables.

EXAMPLE 2

1,275 parts of Polyisocyanate Component II were mixed with 900.8 parts of Isocyanate-reactive Component I and 476.3 parts of propylene glycol monomethyl ether acetate to form a composition having a solids content of 70%. The stabilizers set forth in Tables III and IV were then added to 176.8 part samples of the above composition. The samples were stored at ambient temperature (Table III) and 40° C. (Table IV). The viscosities of the samples were determined at 25° C. at the intervals indicated in the Tables.

EXAMPLE 3

1,275 parts of Polyisocyanate Component II, 1,026 parts of Isocyanate-reactive Component III and 531 parts of propylene glycol monomethyl ether acetate were mixed to form a composition having a solids content of 70%. The stabilizers set forth in Tables V and VI were added to 188.8 part samples of the above composition and the mixtures were stored at ambient temperature (Table V) and at 40° C. (Table VI). The viscosities of the samples were determined at 25° C. at the intervals indicated in the Tables.

EXAMPLE 4

1,400 parts of Polyisocyanate Component III were mixed with 1,173 parts of Isocyanate-reactive Component I and 603 parts of propylene glycol monomethyl ether acetate to form a composition having a solids content of 70%. The stabilizers set forth in Table VII were added to 215 part samples of the above composition and the mixtures were stored at 40° C. The viscosities of the samples were determined at 25° C. at the intervals indicated in the Table.

EXAMPLE 5

1,200 parts of Polyisocyanate Component I were mixed with 422.4 parts of Isocyanate-reactive Component I to form a composition having a solids content of 75%. The stabilizers set forth in Table VIII were added to 202.8 part samples of the above composition. The mixtures were stored at 40° C. and the viscosities were determined at 25° C. at the intervals indicated in the Table.

TABLE I

| Stabilizer | Amount added (g) | Wt % Stabilizer based on total composition (based on solids) | Viscosity at 25° C. (mPa.s) after storage at ambient temperature | | | | | | | |
|---|---|---|---|---|---|---|---|---|---|---|
| | | | Initial | 2 Days | 7 Days | 14 Days | 21 Days | 28 Days | 35 Days | 42 Days |
| None | 0 | 0 (0) | 680 | 810 | 1280 | 1640 | 2040 | 2810 | 2960 | 3280 |
| EG[1] | 0.3 | 0.14 (0.20) | 620 | 750 | 1120 | 1340 | 1640 | 2250 | 2440 | 2520 |
| EG | 0.55 | 0.26 (0.37) | 600 | 790 | 1080 | 1260 | 1520 | 2030 | 2100 | 2240 |
| EG | 1.4 | 0.66 (0.94) | 600 | 700 | 960 | 1040 | 1200 | 1560 | 1540 | 1600 |
| PG[2] | 0.35 | 0.16 (0.23) | 600 | 750 | 1160 | 1400 | 1740 | 2420 | 2500 | 2680 |
| PG | 0.7 | 0.33 (0.47) | 600 | 700 | 1120 | 1320 | 1600 | 2170 | 2180 | 2360 |
| PG | 1.7 | 0.80 (1.14) | 580 | 700 | 1000 | 1120 | 1320 | 1650 | 1700 | 1840 |

[1] Ethylene Glycol
[2] 1,2-Propylene Glycol

TABLE II

| Stabilizer | Amount added (g) | Wt % Stabilizer based on total composition (based on solids) | Viscosity at 25° C. (mPa.s) after storage at 40° C. | | |
|---|---|---|---|---|---|
| | | | Initial | 2 Days | 7 Days |
| None | 0 | 0 (0) | 680 | 2720 | 5800 |
| EG[1] | 0.3 | 0.14 (0.20) | 620 | 2140 | 4320 |
| EG | 0.55 | 0.26 (0.37) | 600 | 1910 | 4000 |
| EG | 1.4 | 0.66 (0.94) | 600 | 1500 | 2700 |
| PG[2] | 0.35 | 0.16 (0.23) | 600 | 2140 | 4480 |
| PG | 0.7 | 0.33 (0.47) | 600 | 2060 | 3040 |
| PG | 1.7 | 0.80 (1.14) | 580 | 1800 | 2800 |

[1]Ethylene Glycol
[2]1,2-Propylene Glycol

TABLE IV

| Stabilizer | Amount added (g) | Wt % Stabilizer based on total composition (based on solids) | Viscosity at 25° C. (mPa.s) after storage at 40° C. | | |
|---|---|---|---|---|---|
| | | | Initial | 2 Days | 7 Days |
| None | 0 | 0 (0) | 1960 | gel | |
| EG[1] | 0.45 | 0.25 (0.36) | 1720 | 200,000 | gel |
| EG | 0.95 | 0.54 (0.77) | 1640 | 96,000 | gel |
| EG | 2.35 | 1.33 (1.90) | 1480 | 12,060 | gel |
| PG[2] | 0.6 | 0.34 (0.48) | 1720 | 200,000 | gel |
| PG | 1.15 | 0.65 (0.93) | 1600 | 62,000 | gel |
| PG | 2.9 | 1.64 (2.34) | 1480 | 17,680 | gel |

[1]Ethylene Glycol
[2]1,2-Propylene Glycol

TABLE III

| Stabilizer | Amount added (g) | Wt % Stabilizer based on total composition (based on solids) | Viscosity at 25° C. (mPa.s) after storage at ambient temperature | | | | | | | |
|---|---|---|---|---|---|---|---|---|---|---|
| | | | Initial | 2 Days | 7 Days | 14 Days | 21 Days | 28 Days | 35 Days | 42 Days |
| None | 0 | 0 (0) | 1960 | 2680 | 5800 | 10,800 | 31,200 | gel | | |
| EG[1] | 0.45 | 0.25 (0.36) | 1720 | 2600 | 4800 | 8000 | 17,800 | 200,000 | gel | |
| EG | 0.95 | 0.54 (0.77) | 1640 | 2380 | 4080 | 6000 | 11,600 | 45,600 | 200,000 | gel |
| EG | 2.35 | 1.33 (1.90) | 1480 | 1880 | 2580 | 3600 | 5600 | 11,200 | 17,000 | 29,000 |
| PG[2] | 0.6 | 0.34 (0.48) | 1720 | 2480 | 5200 | 8000 | 20,000 | 200,000 | gel | |
| PG | 1.15 | 0.65 (0.93) | 1600 | 2300 | 4320 | 6800 | 14,000 | 69,200 | 200,000 | gel |
| PG | 2.9 | 1.64 (2.34) | 1480 | 2000 | 3280 | 4600 | 7000 | 17,840 | 28,000 | 65,000 |

[1]Ethylene Glycol
[2]1,2-Propylene Glycol

TABLE V

| Stabilizer | Amount added (g) | Wt % Stabilizer based on total composition (based on solids) | Viscosity at 25° C. (mPa.s) after storage at ambient temperature for days (d) | | | | | | | | |
|---|---|---|---|---|---|---|---|---|---|---|---|
| | | | Initial | 2 d | 7 d | 14 d | 21 d | 28 d | 35 d | 42 d | 49 d |
| None | 0 | 0 (0) | 380 | 460 | 760 | 1040 | 1280 | 1890 | 2250 | 2240 | 2760 |
| EG[1] | 0.45 | 0.24 (0.34) | 350 | 420 | 640 | 820 | 960 | 1350 | 1580 | 1640 | 1840 |
| EG | 0.95 | 0.50 (0.72) | 330 | 400 | 560 | 680 | 760 | 1040 | 1180 | 1200 | 1320 |
| EG | 2.35 | 1.24 (1.78) | 290 | 300 | 420 | 460 | 440 | 570 | 640 | 600 | 680 |
| PG[2] | 0.6 | 0.32 (0.45) | 320 | 400 | 620 | 800 | 920 | 1290 | 1540 | 1560 | 1720 |
| PG | 1.15 | 0.61 (0.87) | 300 | 350 | 540 | 660 | 720 | 990 | 1120 | 1160 | 1280 |
| PG | 2.9 | 1.54 (2.19) | 280 | 310 | 420 | 460 | 440 | 560 | 640 | 600 | 640 |

[1]Ethylene Glycol
[2]1,2-Propylene Glycol

TABLE VI

| Stabilizer | Amount added (g) | Wt % Stabilizer based on total composition (based on solids) | Viscosity at 25° C. (mPa.s) after storage at 40° C. | | | |
|---|---|---|---|---|---|---|
| | | | Initial | 2 Days | 7 Days | 14 Days |
| None | 0 | 0 (0) | 380 | 1560 | 9400 | 10800 |
| EG[1] | 0.45 | 0.24 (0.34) | 350 | 1250 | 4200 | 4600 |
| EG | 0.95 | 0.50 (0.72) | 330 | 1060 | 2600 | 3040 |
| EG | 2.35 | 1.24 (1.78) | 290 | 640 | 960 | 960 |
| PG[2] | 0.6 | 0.32 (0.45) | 320 | 1230 | 4000 | 4400 |
| PG | 1.15 | 0.61 (0.87) | 300 | 930 | 2400 | 2480 |
| PG | 2.9 | 1.54 (2.19) | 280 | 550 | 800 | 800 |

[1]Ethylene Glycol
[2]1,2-Propylene Glycol

TABLE VII

| Stabilizer | Amount added (g) | Wt % Stabilizer based on total composition (based on solids) | Viscosity at 25° C. (mPa.s) after storage at 40° C. | | | |
|---|---|---|---|---|---|---|
| | | | Initial | 1 Day | 2 Days | 6 Days |
| None | 0 | 0 (0) | 620 | 940 | 1340 | gel |
| EG[1] | 0.63 | 0.29 (0.42) | 610 | 900 | 1200 | 200,000 |
| EG | 1.25 | 0.58 (0.83) | 580 | 840 | 1080 | 20,000 |
| EG | 3.15 | 1.47 (2.10) | 540 | 780 | 920 | 3,400 |
| PG[2] | 0.75 | 0.35 (0.50) | 580 | 920 | 1220 | 200,000 |
| PG | 1.55 | 0.72 (1.03) | 560 | 880 | 1150 | 37,600 |

TABLE VII-continued

| Stabilizer | Amount added (g) | Wt % Stabilizer based on total composition (based on solids) | Viscosity at 25° C. (mPa.s) after storage at 40° C. | | | |
|---|---|---|---|---|---|---|
| | | | Initial | 1 Day | 2 Days | 6 Days |
| PG | 3.85 | 1.79 (2.56) | 520 | 780 | 960 | 5,000 |

(1)Ethylene Glycol
(2)1,2-Propylene Glycol

TABLE VIII

| Stabilizer | Amount added (g) | Wt % Stabilizer based on total composition (based on solids) | Viscosity at 25° C. (mPa.s) after storage at 40° C. | | | | |
|---|---|---|---|---|---|---|---|
| | | | Initial | 1 Day | 2 Days | 3 Days | 4 Days |
| None | 0 | 0 (0) | 680 | 1940 | 3860 | 6560 | 10,600 |
| EG(1) | 0.42 | 0.21 (0.28) | 800 | 1700 | 3140 | 4880 | 6720 |
| EG | 1.07 | 0.53 (0.71) | 840 | 1500 | 2440 | 3600 | 4800 |
| EG | 4.2 | 2.1 (2.8) | 750 | 1160 | 1480 | 1840 | 2320 |
| 1,4-butane diol | 4.2 | 2.1 (2.8) | 720 | 1240 | 1550 | 2240 | 2760 |
| glycerine | 4.2 | 2.1 (2.8) | 820 | 1520 | 2100 | 2980 | 3760 |

(1)Ethylene Glycol

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for improving storage stability of a composition containing
    (a) a blocked polyisocyanate component prepared by blocking the isocyanate groups of an organic polyisocyanate with a blocking agent comprising a di-$C_1$-$C_{12}$-alkyl and/or -alkoxyalkyl malonate and
    (b) a component comprising a compound containing at least 2 isocyanate-reactive hydrogens and having a molecular weight of about 800 to 10,000,
which comprises incorporating a stabilizing amount of a low molecular weight compound having at least 2 hydroxyl groups and a molecular weight of less than 400 into the composition by adding said compound to component (a), component (b) or to the mixture of components (a) and (b), said composition not containing a stabilizing amount of a compound which has monofunctional reactivity toward isocyanate groups.

2. The process of claim 1 wherein said organic polyisocyanate of component (a) is a polyisocyanate adduct.

3. The process of claim 1 wherein said organic polyisocyanate of component (a) is an isocyanate-terminated prepolymer.

4. The process of claim 1 wherein said isocyanate-reactive hydrogens of component (b) are hydroxyl groups.

5. The process of claim 1 wherein said low molecular weight compound is present in an amount greater than about 0.2% by weight based on the weight of components (a) and (b).

6. The process of claim 1 wherein up to about 60 mole % of the di-$C_1$-$C_{12}$-alkyl and/or -alkoxyalkyl malonate blocking agent is replaced by an acetoacetic acid $C_1$-$C_{12}$-alkyl or -alkoxyalkyl ester.

7. The process of claim 1 wherein said blocking agent comprises diethyl malonate.

8. The process of claim 5 wherein said low molecular weight compound comprises a compound corresponding to the formula $$R_1(OH)_n$$

wherein $R_1$ is a straight or branched chain having 2 to 10 carbon atoms and n has a value of 2 or 3.

9. A composition with improved storage stability which comprises
    (a) a blocked polyisocyanate component prepared by blocking the isocyanate groups of an organic polyisocyanate with a blocking agent comprising a di-$C_1$-$C_{12}$-alkyl and/or -alkoxyalkyl malonate,
    (b) a component comprising a compound containing at least 2 isocyanate-reactive hydrogens and having a molecular weight of about 800 to 10,000 and
    (c) a stabilizing amount of a low molecular weight compound having at least 2 hydroxyl groups and a molecular weight of less than 400.

10. The composition of claim 9 wherein said organic polyisocyanate of component (a) is a polyisocyanate adduct.

11. The composition of claim 9 wherein said organic polyisocyanate of component (a) is an isocyanate-terminated prepolymer.

12. The composition of claim 9 wherein said isocyanate-reactive hydrogens of component (b) are hydroxyl groups.

13. The composition of claim 9 wherein said low molecular weight compound is present in an amount greater than 0.2% by weight based on the weight of components (a) and (b).

14. The composition of claim 12 wherein said low molecular weight compound is present in an amount greater than 0.2% by weight based on the weight of components (a) and (b).

15. The composition of claim 9 wherein up to about 60 mole % of the di-$C_1$-$C_{12}$-alkyl and/or -alkoxyalkyl malonate is replaced by an acetoacetic acid $C_1$-$C_{12}$-alkyl or -alkoxyalkyl ester.

16. The composition of claim 9 wherein said blocking agent comprises diethyl malonate.

17. The composition of claim 9 wherein said low molecular weight compound comprises a compound corresponding to the formula $$R_1(OH)_n$$

wherein $R_1$ is a straight or branched chain having 2 to 10 carbon atoms and n has a value of 2 or 3.

18. A composition with improved storage stability which comprises
   (a) a blocked polyisocyanate component prepared by blocking the isocyanate groups of a polyisocyanate adduct with a blocking agent comprising diethyl malonate,
   (b) a component comprising a compound containing at least 2 hydroxyl groups and having a molecular weight of about 1,000 to 3,000 and
   (c) a low molecular weight compound having at least 2 hydroxyl groups and a molecular weight of less than 400 in an amount greater than about 0.2% by weight, based on the weight of components (a) and (b).

19. The composition of claim 18 wherein said polyisocyanate adduct is prepared from 1,6-hexamethylene diisocyanate.

20. The composition of claim 18 wherein component (b) comprises a member selected from the group consisting of polyether polyols, polycarbonates containing hydroxyl groups and polyhydroxy polyacrylates.

21. The composition of claim 18 wherein said low molecular weight compound comprises a compound corresponding to the formula $$R_1(OH)_n$$

wherein $R_1$ is a straight or branched chain having 2 to 10 carbon atoms and n has a value of 2 or 3.

22. The conposition of claim 20 wherein said low molecular weight compound comprises a compound corresponding to the formula $$R_1(OH)_n$$

wherein $R_1$ is a straight or branched chain having 2 to 10 carbon atoms and n has a value of 2 or 3.

23. The composition of claim 18 wherein up to about 60 mole % of the diethyl malonate blocking agent is replaced by ethylacetoacetate.

* * * * *